United States Patent
Park

(10) Patent No.: US 11,495,074 B2
(45) Date of Patent: Nov. 8, 2022

(54) FACE RECOGNITION UNLOCKING DEVICE AND OPERATION METHOD THEREOF

(71) Applicants: Hyundai Motor Company, Seoul (KR); Kia Motors Corporation, Seoul (KR)

(72) Inventor: Min Gu Park, Pocheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 113 days.

(21) Appl. No.: 16/866,881

(22) Filed: May 5, 2020

(65) Prior Publication Data
US 2021/0183194 A1    Jun. 17, 2021

(30) Foreign Application Priority Data
Dec. 12, 2019 (KR) .................. 10-2019-0166069

(51) Int. Cl.
| | |
|---|---|
| *G07C 9/37* | (2020.01) |
| *B60R 25/25* | (2013.01) |
| *G07C 9/00* | (2020.01) |
| *G06V 40/16* | (2022.01) |

(52) U.S. Cl.
CPC .............. *G07C 9/37* (2020.01); *B60R 25/25* (2013.01); *G06V 40/172* (2022.01); *G07C 9/00563* (2013.01)

(58) Field of Classification Search
None
See application file for complete search history.

(56) References Cited

U.S. PATENT DOCUMENTS

| | | | | |
|---|---|---|---|---|
| 2004/0213437 | A1* | 10/2004 | Howard ................. | G06F 16/93 707/999.009 |
| 2009/0010501 | A1* | 1/2009 | Ogawa ................. | G06V 40/165 382/118 |
| 2009/0096871 | A1* | 4/2009 | Kuwano ............ | G06K 9/00295 348/169 |
| 2011/0013812 | A1* | 1/2011 | Shin ........................ | G07C 9/37 382/118 |
| 2015/0010203 | A1* | 1/2015 | Muninder .......... | G06V 10/7715 382/103 |
| 2015/0139520 | A1* | 5/2015 | Senegas ............... | G06K 9/6269 382/131 |

(Continued)

FOREIGN PATENT DOCUMENTS

CN        107492116 A  * 12/2017

OTHER PUBLICATIONS

Fan, Lixin. "A feature-based object tracking method using online template switching and feature adaptation." 2011 Sixth International Conference on Image and Graphics. IEEE, 2011. (Year: 2011).*

(Continued)

*Primary Examiner* — Michelle M Entezari
(74) *Attorney, Agent, or Firm* — Slater Matsil, LLP

(57) ABSTRACT

A face recognition unlocking device includes a collection device configured to obtain information of a user, a controller configured to determine whether face recognition of the user succeeds, based on the information of the user, and calculate a location of the user for success in the face recognition, and an output device configured to guide the user to move.

20 Claims, 19 Drawing Sheets

(56) References Cited

U.S. PATENT DOCUMENTS

| | | | | |
|---|---|---|---|---|
| 2016/0063727 A1* | 3/2016 | Gao | ................... | G06V 10/255 |
| | | | | 382/103 |
| 2016/0104034 A1* | 4/2016 | Wilder | ................. | G06V 40/50 |
| | | | | 382/118 |
| 2016/0188997 A1* | 6/2016 | Desnoyer | .............. | G06V 20/46 |
| | | | | 382/190 |
| 2017/0098119 A1* | 4/2017 | Gope | .................. | G06V 40/171 |
| 2019/0077372 A1* | 3/2019 | Greenberg | ............ | B60R 25/23 |
| 2019/0080065 A1* | 3/2019 | Sheik-Nainar | ........ | G06V 40/40 |
| 2019/0080066 A1* | 3/2019 | Van Os | ................ | G06F 3/0488 |
| 2020/0151430 A1* | 5/2020 | Hassan | ................. | G06F 21/32 |

OTHER PUBLICATIONS

CN 107492116 A Abstract English Translation (Year: 2017).*

\* cited by examiner

FACE RECOGNITION UNLOCKING DEVICE AND OPERATION METHOD THEREOF

CROSS-REFERENCE TO RELATED APPLICATIONS

This application claims priority to Korean Patent Application No. 10-2019-0166069, filed in the Korean Intellectual Property Office on Dec. 12, 2019, which application is hereby incorporated herein by reference.

TECHNICAL FIELD

The present disclosure relates to a face recognition unlocking device and an operation method thereof.

BACKGROUND

Face recognition unlocking technology is a technology of recognizing a user through biometric data, determining whether the recognized user is the registered user to unlock a building or a vehicle, determining whether the user is the registered user although the user does not have a separate authentication means, and allowing entrance into the building or the vehicle.

It is possible for the face recognition unlocking technology to have the considerably lower risk of theft or loss and save more time than a password unlocking technology and an IC card unlocking technology.

Thus, the face recognition unlocking technology has been widely used in fields, such as a building and a vehicle, which should limit access of an unauthorized user for security or safety reasons.

Portions which should be particularly considered in face recognition technology are two portions of collecting biometric data and processing of the biometric data. Recently, data processing technology has made rapid progress through big data-based analysis, machine learning technology, and the like.

On the other hand, for a data collection method of an existing face recognition unlocking device, because an optimum recognition location is always varied according to a location where a face recognition device is installed, a body type of a user, performance of a data collection device, and the like, a recognition rate is degraded and it is impossible to perform quick authentication.

SUMMARY

The present disclosure has been made to solve problems occurring in the prior art while advantages achieved by the prior art are maintained intact.

An embodiment of the present disclosure provides a face recognition unlocking device for guiding a user to move such that a face recognition function is easily performed and an operation method thereof.

Technical problems to be solved by the present inventive concept are not limited to the aforementioned problems, and any other technical problems not mentioned herein will be clearly understood from the following description by those skilled in the art to which the present disclosure pertains.

According to an embodiment of the present disclosure, a face recognition unlocking device may include a collection device that obtains information of a user, a controller that determines whether face recognition of the user succeeds, based on the information of the user, and calculates a location of the user for success in the face recognition, and an output device that guides the user to move.

Furthermore, in an embodiment, the controller may calculate the location of the user for success of the face recognition, when the face recognition fails. The output device may guide the user to move, based on the calculated location of the user.

Furthermore, in an embodiment, the output device may output at least any one of a first guide and/or a second guide to guide the user to move to the calculated location of the user, when the face recognition fails.

Furthermore, the first guide may guide the user to move into range of a view angle of a camera in the collection device, when the user is outside the range of the view angle of the camera in the collection device.

Furthermore, the second guide may guide the user to move forward and backward or left and right with respect to a camera in the collection device, when the user is within range of a view angle of the camera in the collection device.

Furthermore, in an embodiment, the controller may store a user profile, when the face recognition succeeds. The user profile may include at least any one of location information of the user who succeeds in the face recognition and/or face image information of the user who succeeds in the face recognition.

Furthermore, in an embodiment, the controller may apply a user profile, including at least any one of location of the user who succeeds in the face recognition and/or face image information of the user who succeeds in the face recognition, to calculate the location of the user for success of the face recognition.

Furthermore, in an embodiment, a user registration mode may be executed, when the face recognition unlocking device is enabled and when a condition for executing the user registration mode is met. The output device may output a third guide to guide the user to move, when the user registration mode is executed. The collection device may obtain the information of the user who moves along the third guide. The controller may store a registration user profile including at least any one of location information of the user who succeeds in the face recognition and/or face image information of the user who succeeds in the face recognition.

Furthermore, in an embodiment, a user authentication mode may be executed, when the face recognition unlocking device is enabled and when a condition for executing the user authentication mode is met. The output device may output a fourth guide to guide the user to move, when the user authentication mode is executed. The collection device may obtain the information of the user who moves along the fourth guide. The controller may compare a user profile, including at least any one of location information of the user who succeeds in the face recognition and/or face image information of the user who succeeds in the face recognition, with a previously stored registration user profile, may output a face authentication success signal through the output device when the user is the same person as a previously stored registration user, and may output a face authentication failure signal through the output device when the user is not the same person as the previously stored registration user.

Furthermore, the controller may apply a user profile when the user is the same person as the previously stored registration user to at least any one of calculation of the location of the user and/or the fourth guide.

According to another embodiment of the present disclosure, an operation method of a face recognition unlocking device may include obtaining information of a user, determining whether face recognition of the user succeeds, based on the information of the user, calculating a location of the user for success in the face recognition, and guiding the user to move.

Furthermore, in an embodiment, the guiding of the user to move may include guiding the user to move, based on the calculated location of the user, when the face recognition fails.

Furthermore, in an embodiment, the guiding of the user to move may include outputting at least any one of a first guide and/or a second guide to guide the user to move to the calculated location of the user, when the face recognition fails.

Furthermore, the first guide may guide the user to move into range of a view angle of a camera in the collection device, when the user is outside the range of the view angle of the camera in the collection device.

Furthermore, the second guide may guide the user to move forward and backward or left and right with respect to a camera in the collection device, when the user is within range of a view angle of the camera in the collection device.

Furthermore, in an embodiment, the method may further include storing a user profile, when the face recognition succeeds. The user profile may include at least any one of location information of the user who succeeds in the face recognition and/or face image information of the user who succeeds in the face recognition.

Furthermore, in an embodiment, the determining of whether the face recognition of the user succeeds and the calculating of the location of the user for the success in the face recognition may further include applying a user profile, including at least any one of location information of the user who succeeds in the face recognition and/or face image information of the user who succeeds in the face recognition, to calculating the location of the user for the success in the face recognition.

Furthermore, in an embodiment, the method may further include executing a user registration mode, when the face recognition unlocking device is enabled and when a condition for executing the user registration mode is met, outputting a third guide to guide the user to move, when the user registration mode is executed, and storing a registration user profile including at least any one of location information of the user who succeeds in the face recognition and/or face image information of the user who succeeds in the face recognition. The obtaining of the information of the user may include obtaining the information of the user who moves along the third guide.

Furthermore, in an embodiment, the method may further include executing a user authentication mode, when the face recognition unlocking device is enabled and when a condition for executing the user authentication mode is met, outputting a fourth guide to guide the user to move, when the user authentication mode is executed, and comparing a user profile, including at least any one of location information of the user who succeeds in the face recognition and/or face image information of the user who succeeds in the face recognition, with a previously stored registration user profile, outputting a face authentication success signal when the user is the same person as a previously stored registration user, and outputting a face authentication failure signal when the user is not the same person as the previously stored registration user. The obtaining of the information of the user may include obtaining the information of the user who moves along the fourth guide.

Furthermore, the method may further include applying a user profile when the user is the same person as the previously stored registration user to at least any one of calculation of the location of the user and/or the fourth guide.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF ILLUSTRATIVE EMBODIMENTS

Figure 1:
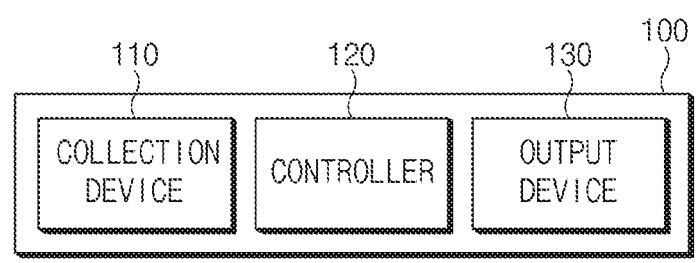
FIG. 1 is a block diagram illustrating a face recognition unlocking device according to an embodiment of the present disclosure.

Hereinafter, some embodiments of the present disclosure will be described in detail with reference to the exemplary drawings. The following introduced exemplary embodiments are only provided as examples so that the present disclosure will fully convey the spirit of the present disclosure to those skilled in the art and are not limited to the embodiments provided in the present disclosure. The present disclosure is embodied in another implementation form. The drawing may omit illustrating a portion irrespective of the description for clarifying the present disclosure, and the size and the like of the component are exaggerated and expressed for better understanding.

Furthermore, in adding the reference numerals to the components of each drawing, it should be noted that the identical or equivalent component is designated by the identical numeral even when they are displayed on other drawings. Further, in describing the embodiment of the present disclosure, a detailed description of well-known features or functions will be omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure discloses contents about a face recognition unlocking device of a vehicle as an embodiment, but is not necessarily limited to being used for a vehicle. The present disclosure may be used in various fields, such as a building entrance, in which access restriction and user authentication are desired.

Hereinafter, embodiments of the present disclosure will be described in detail with reference to FIGS. 1 to 19.

FIG. 1 is a block diagram illustrating a face recognition unlocking device according to an embodiment of the present disclosure.

Referring to FIG. 1, a face recognition unlocking device 100 may include a collection device 110, a controller 120, and an output device 130.

The collection device 110 may obtain information of a user. The obtained information of the user may include at least any one of information about whether the face recognition unlocking device 100 is enabled, location information of the user, and/or face image information of the user.

The controller 120 may determine whether face recognition of the user succeeds based on the collected user information and may calculate a location of the user for success in face recognition based on the collected user information.

In addition, the controller 120 may control the output device 130 to output a guide. In this case, the output guide may be varied according to a mode of the face recognition unlocking device 100. Furthermore, the output guide may be varied according to the obtained user information.

The output device 130 may guide the user to move. The output device 130 may guide the user to move through a guide provided/output to the user. The guide may include at least any one of a first guide, a second guide, a third guide, and/or a fourth guide.

The output device 130 may output at least one or more of a face authentication success signal and a face authentication failure signal as well as the guide. The user may quickly identify whether face authentication succeeds through the output face authentication success and failure signals.

The collection device 110 of the face recognition unlocking device 100 according to an embodiment of the present disclosure may include an input signal collection device, an image collection device, and a location collection device.

According to an embodiment, the input signal collection device may be an input device which obtains information about whether the face recognition unlocking device 100 is enabled, which may include a toggle type switch. When the toggle type switch is included, the input signal collection device may obtain information about an input time when the toggle type switch is pushed, on/off information of the toggle type switch, or the like.

The controller 120 may take information of the user, including the information about the input time and the on/off information of the toggle type switch, which are obtained through the input signal collection device, as the basis of determining whether the face recognition unlocking device 100 is enabled.

Furthermore, the controller 120 may take the information of the user, obtained through the input signal collection device, as the basis of determining whether to execute a user registration mode or a user authentication mode.

The input signal collection unit is not necessarily limited to the toggle type switch, and a component capable of obtaining information of the user is sufficient for the input signal collection device. For example, although not illustrated in the drawing, information indicating whether touch is on/off, touch time information, and the like may be obtained via a capacitive touch switch device, and the touch switch device may be used as the input signal collection unit.

It is possible for the input signal collection unit to be replaced with another component. For example, the input signal collection unit may be replaced using the location collection device and the image collection device.

When the user accesses the face recognition unlocking device 100 within a predetermined location and maintains the location during a certain time, the controller 120 may take such information of the user as the basis of determining whether the face recognition unlocking device 100 is enabled.

By including the input signal collection device, power consumption of the face recognition unlocking device 100 according to an embodiment of the present disclosure may be reduced.

In an embodiment, only when it is determined that the face recognition unlocking device 100 is enabled using the information of the user, collected by the input signal collection device, the controller 120 may control the image collection device and the location collection device to operate.

When the face recognition unlocking device 100 is not enabled, the controller 120 may block power supplied to the image collection device and the location collection device, thus reducing power consumption at an idle state.

According to an embodiment, the face recognition unlocking device 100 may obtain face image information of the user via the image collection device.

At least one or more cameras, such as an infrared camera, a color camera, and/or a depth information camera, may be used as the image collection device. When the infrared camera is used as the image collection device, the image collection device may easily collect user face image information in a dark environment. When the color camera and the depth information camera are used as the image collection device, the image collection device may more easily obtain user face image information.

The image collection device is not necessarily limited to the exemplified cameras, and a component capable of performing face recognition using the face image information obtained via the image collection device is sufficient for the image collection device.

According to an embodiment, the face recognition unlocking device 100 may obtain location information of the user using the location collection device.

At least one or more of an infrared sensor and/or an ultrasonic sensor may be used as the location collection device. The obtained location information may include at least any one of a relative location of the user with respect to the face recognition unlocking device 100 and/or an absolute location such as global positioning system (GPS) coordinates.

The obtained location information is not limited to the exemplified contents, and information capable of calculating a location of the user for success in face recognition through the location information obtained by the controller 120 is sufficient for the obtained location information.

According to an embodiment, the controller 120 may include a processor, and may additionally include a memory if necessary. The controller 120 may determine whether face recognition of the user succeeds based on the information of the user obtained through the collection device 110 and may calculate a location of the user for success in the face recognition.

Whether the face recognition succeeds may refer to whether it is possible for the user to be identified through face image information of the user in the information of the user, obtained through the collection device 110.

In other words, when it is possible for the controller 120 to specify the user through the obtained information of the user, it may determine that the face recognition succeeds. In this case, the determination of whether face recognition succeeds may be varied according to a predetermined face authentication method.

For example, when performing user authentication using a method of measuring and comparing relative distance rates between ears, eyes, mouth, and nose, the controller 120 may detect a face region from the collected image, may detect a face feature point from the detected face region, and may mathematically perform matrix arithmetic processing of a face feature point vector value, thus performing face authentication.

In this case, when the information of the user is obtained to the point of detecting a face feature point from a face region of the user through the collection device 110, the controller 120 may determine that the face recognition succeeds.

The processor may be a central processing unit (CPU) or a semiconductor device for processing instructions stored in a memory. In detail, the processor may be a semiconductor device which processes information of the user, collected by the collection device 110.

The processor may read out information stored in the memory or information of the user, collected by the collection device 110, and may write information in the memory. In an embodiment, the memory may be integrally formed with the processor.

The processor may determine whether face recognition of the user succeeds based on the information of the user, obtained through the collection device 110, may calculate a location of the user for success in face recognition, and may determine whether the face recognition unlocking device 100 is enabled. Furthermore, the processor may process an output control command for a guide output by the face recognition unlocking device 100.

The memory may include various types of volatile or non-volatile memories. For example, the memory may include a read only memory (ROM) and a random access memory (RAM).

When it is determined that the face recognition of the user succeeds, the controller 120 may store or write a user profile of the user who succeeds in the face recognition.

Herein, when the face recognition of the user succeeds, the user profile may be an information set including at least any one of location information of the user who succeeds in the face recognition and/or face image information of the user who succeeds in the face recognition.

The stored user profile may be applied later when the controller 120 calculates a location of the user for success in face recognition and may be applied to a guide for guiding the user to move.

In other words, the controller 120 may calculate a location of the user, with a high face recognition success rate, with reference to the user profile stored in the memory or may adjust a guide output through the output device 130 to guide the user to a location where it is expected that a face recognition success rate will be high.

Meanwhile, the face recognition unlocking device 100 may be configured to include the processor and the memory.

In another embodiment, the face recognition unlocking device 100 may be configured such that the processor and the memory are physically separated from another component of the face recognition unlocking device 100 via a separate server or the like.

According to an embodiment of the present disclosure, the controller 120 may determine whether face recognition of the user succeeds based on the information collected through the collection device 110.

When the face recognition fails, the controller 120 may calculate a location of the user for success in the face recognition. The location of the user for the success in the face recognition may be calculated as the controller 120 calculates information of the user, including face image information of the user and location information of the user, collected through the collection device 110.

The location of the user for the success in the face recognition may be varied according to a predetermined face authentication method.

For example, when performing user authentication using a method for measuring and comparing relative distance rates between ears, eyes, mouth, and nose from the obtained face image information of the user, the controller 120 may calculate a location where it is possible for information of the user to be obtained to the point of detecting a face feature point from a face region of the user through the collection device 110 as a location of the user for success in face recognition.

The location of the user for the success in the face recognition may be varied according to a body type of the user, an operation environment (e.g., an operation time, the amount of sunshine, the interior or exterior, and the like) of the face recognition unlocking device 100, or the like.

When calculating the location of the user for the success in the face recognition, the controller 120 may apply location information of the user who previously succeeds in face recognition or may apply location information of the user who succeeds in face recognition using another face recognition unlocking device. This will be described in detail with reference to FIG. 16.

The controller 120 may control the output device 130 to guide the user to move and may control the collection device 110 to obtain information of the user again, after the output device 130 guides the user to move, depending on settings.

Herein, a condition for collecting the information of the user again may be varied according to settings. For example, after the controller 120 guides the user to move using the output device 130, when a predetermined time elapses, the controller 120 may collect the information of the user using the collection device 110.

Alternatively, the controller 120 may be configured to, when the movement of the user is detected through the collection device 110, collect information of the user using the collection device 110.

When the face recognition succeeds, the controller 120 may store a user profile including at least any one of location information of the user and/or face image information of the user. The user profile may be stored in the memory or the like included in the face recognition unlocking device 100 and may be stored in a storage means independent of the face recognition unlocking device 100.

The face recognition unlocking device 100 may use the user profile as a compared target for face authentication. In this case, the compared target may be a previously stored registration user profile.

The face authentication by the controller 120 may be performed through a process independent of face recognition and may be performed at the same time as the face recognition. Herein, for convenience of description, the face recognition and the face authentication will be separately described as separate processes.

According to an embodiment, when the face of the user is recognized by the controller 120, the controller 120 may perform user authentication using a method for measuring and comparing relative distance rates between ears, eyes, mouth, and nose from face image information of the recognized user.

The controller 120 may detect a face region of the user from the collected image, may detect a face feature point from the detected face region, and may mathematically perform matrix arithmetic processing of a face feature point vector value, thus performing face authentication.

In this case, the controller 120 may compare a feature point vector value of face image information of the user who succeeds in the face recognition with a feature point vector value of a previously stored registration user profile to determine whether the user is the same person as a previously stored registration user.

According to an embodiment of the present disclosure, the output device 130 may include a guide output device and an authentication signal output device.

The output device 130 may guide the user to move. In detail, the output device 130 may output at least any one of a first guide, a second guide, a third guide, and/or a fourth guide to guide the user to move.

According to an embodiment, the output device 130 may guide the user to move through a visual signal. For example, the guide output device according to an embodiment of the present disclosure may be a lamp and may preferably be a puddle lamp for a vehicle.

The guide output device is not necessarily limited to the guidance device through the visual signal. A thing capable of guiding the user to move to a location of the user for success in face recognition, calculated by the controller 120, is sufficient for a component corresponding to the guide output device.

For example, although not illustrated in the drawing, a voice output device may be used as the guide output device. In other words, the guide output device may not necessarily need to guide the user to move using a visual method, and a configuration of the guide output device may be varied according to an environment where the face recognition unlocking device 100 is used.

Herein, for convenience of description, hereinafter, the description assumes that there is a guide output device which guides the user using a visual method.

The authentication signal output device may be a component for outputting a signal about whether face authentication succeeds or fails to the user. The signal about whether the face authentication succeeds or fails may include at least any one of a visual signal, an audible signal, and/or a tactile signal.

For example, the output device 130 may propagate information indicating whether the face authentication succeeds or fails through a voice.

In addition, the output device 130 may propagate information indicating whether the face authentication succeeds or fails using a tactile signal through vibration or may propagate information indicating whether the face authentication succeeds or fails through a color of an LED lamp, the number of ON/OFF, or the like.

Figure 2:
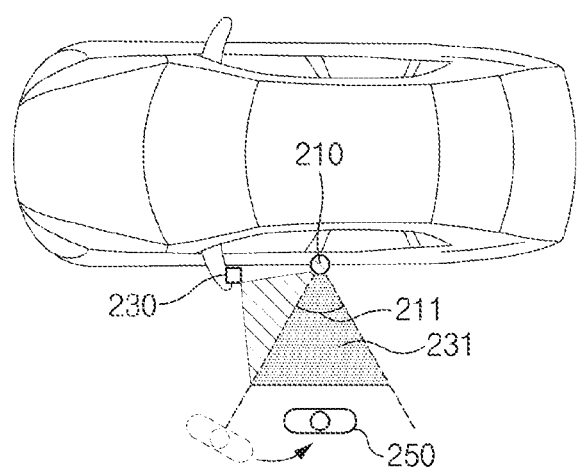
FIG. 2 is a drawing illustrating a first guide output by a face recognition unlocking device according to an embodiment of the present disclosure.

FIG. 2 is a drawing illustrating a first guide in a face recognition unlocking device according to an embodiment of the present disclosure.

When a controller 120 described with reference to FIG. 1 fails in face recognition using information of a user 250, obtained through a collection device 210, an output device 230 may output a first guide 231 to guide the user 250 to move.

When information of the user 250 necessary for face authentication is not collected through the collection device 210 or when the collected information of the user 250 is unsuitable for face recognition, the controller 120 may determine that the face recognition fails.

The first guide 231 may be a guide for guiding the user 250 to move into a range 211 of a view angle, when the user 250 is outside the range 211 of the view angle of a camera in the collection device 210.

When the user 250 is outside the range 211 of the view angle of the camera in the collection device 210, because it is impossible for the collection device 210 to obtain face image information of the user 250, the output device 230 may guide the user 250 to move into the range 211 of the view angle.

The first guide 231 may be output through the output device 230. In this case, as shown, the output device 230 may be a puddle lamp located on a side mirror of the vehicle. A form capable of notifying the user 250 of the range 211 of the view angle of the collection device 210 is sufficient for the first guide 231, and the first guide is not limited to the embodiment.

In an embodiment, the first guide 231 may be a triangular signal shown in FIG. 2. The first guide 231 may indicate a location to which the user 250 will move through a method such as ON/OFF. The user 250 moves according to the guidance of the first guide 231, and the collection device 210 may obtain information of the user at the location where the user 250 moves along the first guide 231.

In other words, after the output device 230 outputs the first guide 231 to guide the user 250 to move, the controller 120 may control the collection device 210 to obtain information of the user 250 again, after the user 250 moves, depending on settings.

The controller 120 may determine whether the face recognition succeeds again through the information of the user 250, obtained by the collection device 210.

Until the face recognition succeeds, the controller 120 may determine whether face recognition of the user 250 succeeds based on the information of the user 250, obtained by the collection device 210, and may calculate a location of the user 250 for success in the face recognition. Furthermore, until the face recognition succeeds, the output device 230 may guide the user 250 to move.

Figure 3:
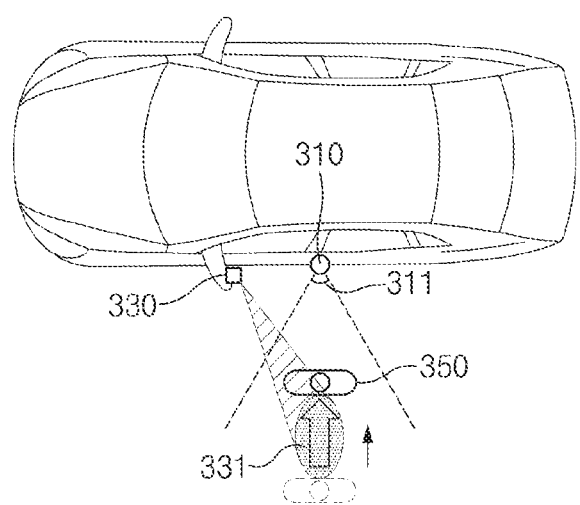
FIGS. 3 and 4 are drawings illustrating a second guide output by a face recognition unlocking device according to an embodiment of the present disclosure.
Figure 4:
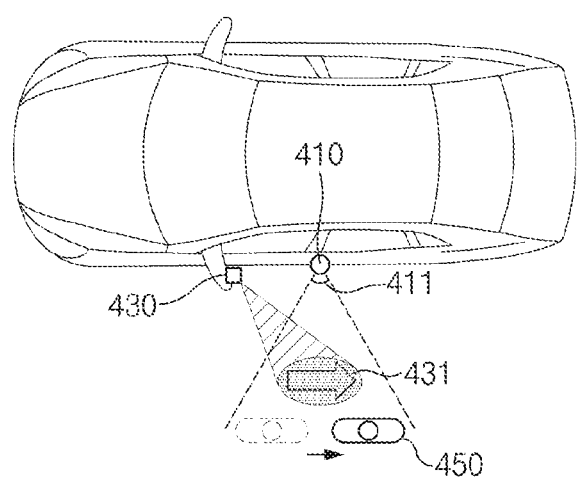

FIGS. 3 and 4 are drawings illustrating a second guide 331 or 431 in a face recognition unlocking device according to an embodiment of the present disclosure.

Referring to FIGS. 3 and 4, when a controller 120 described with reference to FIG. 1 fails in face recognition using information of a user 350 or 450, obtained through a collection device 310 or 410, an output device 330 or 430 may output the second guide 331 or 431 to guide the user 350 or 450 to move.

The second guide 331 of FIG. 3 may be a guide for guiding the user 350 to move forward and backward with respect to the collection device 310, when the user 350 is within a range 311 of a view angle of the collection device 310.

Although the user 350 is within the range 311 of the view angle of the camera in the collection device 310, when the user 350 is far away from the collection device 310 or is very close to the collection device 310, because it is impossible for the collection device 310 to obtain face image information of the user 350, the output device 330 may guide the user 350 to move to a location for success in face recognition.

The second guide 331 of FIG. 3 may be output through the output device 330. A means capable of guiding the user 350 to a location for success in face recognition is sufficient for the second guide 331, and the second guide 331 is not limited to the embodiment.

In an embodiment, the second guide 331 may indicate/display a location to which the user 350 should move using an arrow signal shown in FIG. 3.

The second guide 431 of FIG. 4 may be a guide for guiding the user 450 to move left and right with respect to the collection device 410, when the user 450 is within a range 411 of the view angle of the collection device 410.

Although the user 450 is within the range 411 of the view angle of a camera in the collection device 410, when the user 450 is at one side of the range 411 of the view angle, because it is impossible for the collection device 410 to obtain face image information of the user 450 to the point of being necessary, the output device 430 may guide the user 450 to move to a location for success in face recognition.

The second guide 431 of FIG. 4 may be output through the output device 430. A means capable of guiding the user 450 to a location for success in face recognition is sufficient for the second guide 431, and the second guide 431 is not limited to the embodiment.

The second guide 331 or 431 may indicate a location to which the user 350 or 450 should move through a method such as ON/OFF. The user 350 or 450 may move according to guidance of the second guide 331 or 431, and the collection device 310 or 410 may obtain information of the user 350 or 450 at the location where the user 350 or 450 moves along the second guide 331 or 431.

In other words, after the output device 330 or 430 outputs the second guide 331 or 431 to guide the user 350 or 450 to move, the controller 120 may control the collection device 310 or 410 to obtain information of the user 350 or 450 again, after the user 350 or 450 moves, depending on settings.

The controller 120 may determine whether face recognition succeeds again through the information of the user 350 or 450, obtained by the collection device 310 or 410.

Until the face recognition succeeds, the controller 120 may determine whether the face recognition of the user 350 or 450 succeeds, based on the information of the user 350 or 450, obtained by the collection device 310 or 410, and may calculate a location of the user 350 or 450 for success in face recognition. Furthermore, until the face recognition succeeds, the output device 330 or 430 may guide the user 350 or 450 to move.

Figure 5:
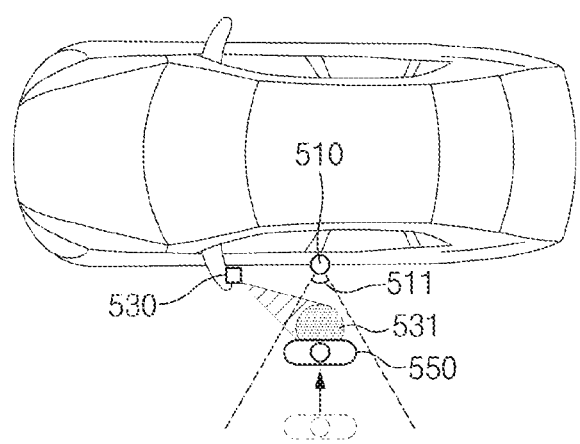
FIG. 5 is a drawing illustrating a third guide output by a face recognition unlocking device according to an embodiment of the present disclosure.

FIG. 5 is a drawing illustrating a third guide 531 in a face recognition unlocking device according to an embodiment of the present disclosure.

When a face recognition unlocking device 100 of FIG. 1 is enabled and a condition for executing a user registration mode is met, the user registration mode may be executed. The user registration mode may be a mode for storing a previously stored user profile which is the basis of determining the face authentication upon the face recognition.

The face recognition unlocking device 100 according to an embodiment of the present disclosure may compare a registration user profile, stored in the user registration mode, with a user profile of a user recognized in a user authentication mode to determine whether face authentication for the user recognized in the user authentication mode is performed.

A condition where the face recognition unlocking device 100 is enabled may be varied according to a user setting.

As an embodiment, an enable signal for the face recognition unlocking device 100 may be obtained through a collection device 510 included in the face recognition unlocking device 100.

When the enable signal is obtained, a controller 120 described with reference to FIG. 1 may determine whether the face recognition unlocking device 100 is enabled based on the enable signal.

The face recognition unlocking device 100 may further have a separate condition for executing the user registration mode other than the enable signal.

For example, the face recognition unlocking device 100 according to an embodiment of the present disclosure may further determine whether a user 550 has a registration user authentication means to determine whether to execute the user registration mode.

The registration user authentication means refers to a means for verifying that the user 550 who has a smart key or a pass is authorized to gain entrance or perform unlocking through the face recognition unlocking device.

In an embodiment of the present disclosure, when an enable signal for the face recognition unlocking device 100 is obtained through the collection device 510, the face recognition unlocking device 100 may be configured to execute the user registration mode, only when a time when the enable signal is obtained is greater than or equal to a predetermined time and only when it is determined whether the smart key is provided together with obtaining the enable signal.

When the face recognition unlocking device 100 is enabled and when the controller 120 determines that the condition for executing the user registration mode is met, an output device 530 may output the third guide 531 to guide the user 550 to move, when the user registration mode is executed.

Referring to FIG. 5, when the user registration mode is executed, before the collection device 510 collects information of the user 550, the output device 520 may output the third guide 531 to guide the user 550 to move.

The third guide 531 may be a guide for guiding the user 550 to move into range of a location where it is expected that face recognition of the user 550 will succeed.

The location where it is expected that the face recognition of the user will succeed may be a location which is preset with respect to the collection device 510 and may be a location which is set based on face recognition success location information stored in a memory of the face recognition unlocking device 100.

The face recognition success location information stored in the memory may refer to a plurality of face recognition success location information collected by a plurality of face recognition unlocking devices. The output device 530 may output the third guide 531 by applying the face recognition success location information collected by the plurality of face recognition unlocking devices.

The third guide 531 may be output through the output device 530. In this case, as shown, the output device 530 may be a puddle lamp located on a side mirror of the vehicle. A thing capable of guiding the user 550 to a specific location is sufficient for the third guide 531, and the third guide 531 is not limited to the embodiment.

In an embodiment, the third guide 531 may be a circular signal shown in FIG. 5. The third guide 531 may guide the user 550 to move through a method such as ON/OFF. The user 550 moves along the third guide 531, and the collection device 510 may obtain information of the user 550 who moves along the third guide 531.

In other words, after the output device 530 outputs the third guide 531 to guide the user 550 to move, the controller 120 may control the collection device 510 to obtain information of the user 550, after the user 550 moves, depending on settings.

The controller 120 may determine whether the face recognition succeeds through the information of the user 550, obtained by the collection device 510.

Until the face recognition succeeds, the controller 120 may determine whether the face recognition of the user 550 succeeds based on the information of the user 550 and may calculate a location of the user 550 for success in face recognition. Furthermore, until the face recognition succeeds, the output device 530 may guide the user 550 to move.

When the user registration mode is executed and when the controller 120 succeeds in the face recognition, the controller 120 may store a registration user profile. In this case, the registration user profile may include at least any one of location information of the user 550 and/or face image information of the user 550.

Until the face recognition succeeds, the controller 120 may determine whether the face recognition of the user 550 succeeds, based on the information of the user 550, and may calculate a location of the user 550 for success in the face recognition. Furthermore, until the face recognition succeeds, the output device 530 may guide the user 550 to move.

The registration user profile and location information of the user 550 and face image information of the user 550, which are included in the registration user profile, will be described in detail with reference to FIGS. 8 to 12.

Figure 6:
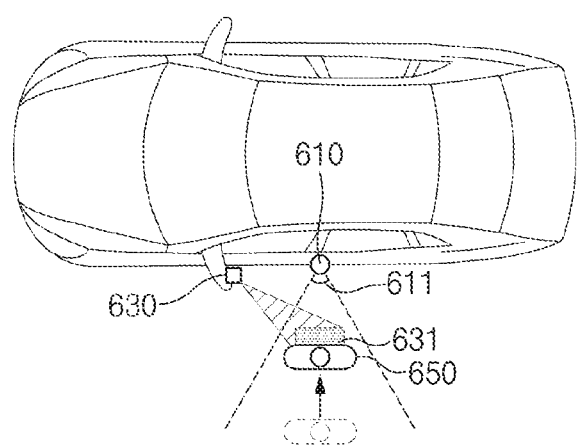
FIG. 6 is a drawing illustrating a fourth guide output by a face recognition unlocking device according to an embodiment of the present disclosure.

FIG. 6 is a drawing illustrating a fourth guide 631 in a face recognition unlocking device according to an embodiment of the present disclosure.

When a face recognition unlocking device 100 of FIG. 1 is enabled and a condition for executing a user authentication mode is met, the user authentication mode may be executed. The user authentication mode may be a mode for comparing a previously registered user profile with a current user profile to authenticate a user 650.

In other words, the face recognition unlocking device 100 according to an embodiment of the present disclosure may compare a registration user profile, stored in a user registration mode, with a user profile of a user 650 recognized in the user authentication mode to determine whether face authentication for the user 650 recognized in the user authentication mode is performed.

A condition where the face recognition unlocking device 100 is enabled may be varied according to a user setting.

As an embodiment, an enable signal for the face recognition unlocking device 100 may be obtained through a collection device 610 included in the face recognition unlocking device 100.

When the enable signal is obtained, a controller 120 described with reference to FIG. 1 may determine whether the face recognition unlocking device 100 is enabled based on the enable signal.

The face recognition unlocking device 100 may further have a separate condition for executing the user authentication mode other than the enable signal.

For example, the face recognition unlocking device 100 according to an embodiment of the present disclosure may further determine whether the user 650 has a registration user authentication means to determine whether to execute the user registration mode.

The registration user authentication means refers to a means for verifying that the user 650 who has a smart key or a pass is authorized to gain entrance or perform unlocking through the face recognition unlocking device 100.

In an embodiment of the present disclosure, when an enable signal for the face recognition unlocking device 100 is obtained through the collection device 610, the face recognition unlocking device 100 may be configured to execute the user authentication mode, when a time when the enable signal is obtained is less than a predetermined time or when the smart key is not provided although the time when the enable signal is obtained is greater than or equal to the predetermined time.

When the face recognition unlocking device 100 is enabled and when the controller 120 determines that the condition for executing the user authentication mode is met, an output device 630 may output the fourth guide 631 to guide the user 650 to move, when the user authentication mode is executed.

Referring to FIG. 6, when the user authentication mode is executed, before the collection device 610 collects information of the user 650, the output device 620 may output the fourth guide 631 to guide the user 650 to move.

The fourth guide 631 may be a guide for guiding the user 650 to move into a range of a location where it is expected that face recognition of the user 650 will succeed. The location where it is expected that the face recognition of the user 650 will succeed may be a location which is preset with respect to the collection device 610 and may be a location which is set based on face recognition success location information stored in a memory of the face recognition unlocking device 100.

The face recognition success location information used in the user authentication mode may refer to information collected through the face recognition unlocking device 100.

Because the user authentication mode is for determining whether the user 650 is a registered user, the face recognition unlocking device 100 may output the fourth guide 631 by applying the collected face recognition success location information.

The controller 120 may apply location information in which face recognition of the user 650 succeeds, which is previously collected, to a form of the fourth guide 631 or calculation of a location of the user 650 for success in face recognition. Contents thereof will be described in detail with reference to FIG. 7.

The fourth guide 631 may be output through the output device 630. In this case, as shown, the output device 630 may be a puddle lamp located on a side mirror of the vehicle. A thing capable of guiding the user 650 to a specific location is sufficient for the fourth guide 631, and the fourth guide 631 is not limited to the embodiment.

In an embodiment, the fourth guide 631 may be a rectangular signal shown in FIG. 6. The fourth guide 631 may guide the user 550 to move through a method such as ON/OFF. The user 650 moves along the fourth guide 631, and the collection device 610 may obtain information of the user 650 who moves along the fourth guide 631.

In other words, after the output device 630 outputs the fourth guide 631 to guide the user 650 to move, the controller 120 may control the collection device 610 to obtain information of the user 650, after the user 650 moves, depending on settings.

The controller 120 may determine whether the face recognition succeeds through the information of the user 650, obtained by the collection device 610.

Until the face recognition succeeds, the controller 120 may determine whether the face recognition of the user 650 succeeds, based on the information of the user 650, and may calculate a location of the user 650 for success in face recognition. Furthermore, until the face recognition succeeds, the output device 630 may guide the user 650 to move.

When the user authentication mode is executed and when the controller 120 succeeds in the face recognition, the controller 120 may compare a user profile with a previously stored registration user profile. In this case, the user profile may include at least any one of location information of the user 650 and/or face image information of the user 650.

The controller 120 may process the obtained user face image information and may compare the user profile with the previously stored registration user profile.

For example, the controller 120 may detect a face region of the user 650 from the user face image information of the user profile and may detect a face feature point from the detected face region, thus mathematically performing matrix arithmetic processing of a face feature point vector value.

In this case, the controller 120 may compare the face feature point vector value, the matrix arithmetic processing of which is performed, with a feature vector value of the previously stored registration user profile to determine whether the user 650 is the same person as a previously stored registration user.

When the user 650 is the same person as the previously stored registration user, the controller 120 may output a face authentication success signal through the output device 630. When the user 650 is not the same person as the previously stored registration user, the controller 120 may output a face authentication failure signal through the output device 630.

The face authentication success signal or the face authentication failure signal may be output through an authentication signal output device of the output device 630.

In this case, the output device 630 may output the face authentication success or failure signal as a visual signal, an audible signal, a tactile signal, or a combination thereof.

Figure 7:
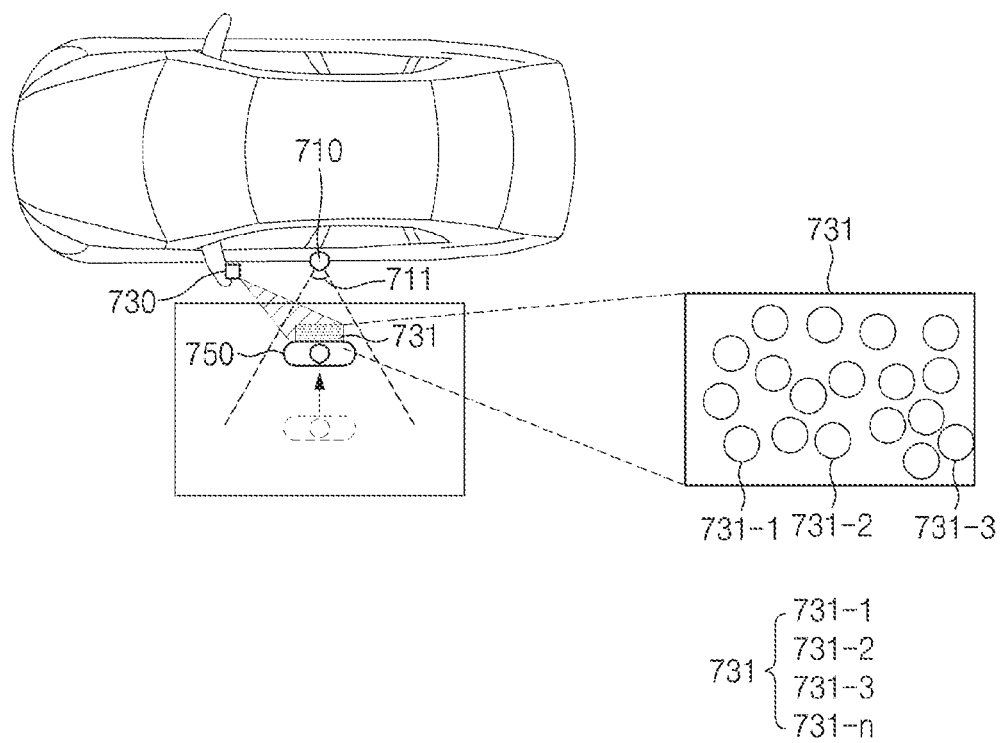
FIG. 7 is a drawing illustrating a fourth guide to which a user profile is applied according to an embodiment of the present disclosure.

FIG. 7 is a drawing illustrating a fourth guide 731 to which a user profile is applied according to an embodiment of the present disclosure.

Referring to FIG. 7, when a user authentication mode is executed, before a collection device 710 collects information of a user 750, an output device 730 may output the fourth guide 731 to guide the user 750 to move.

In detail, the fourth guide 731 may be a guide including location information of first to nth user profiles 731-1 to 731-$n$ of first to nth users who succeed in face recognition.

The fourth guide 731 may be in the form of all user location information of the first to nth user profiles 731-1 to 731-$n$.

A controller 120 of FIG. 1 may calculate a location with the highest frequency where face recognition of the user succeeds, based on the user location information of the first to nth user profiles 731-1 to 731-$n$.

Furthermore, the controller 120 may output the fourth guide 731 for guiding the user 750 to the location with the highest frequency where the face recognition of the user succeeds, through the output device 730.

The controller 120 may apply the user location information of the first to nth user profiles 731-1 to 731-$n$ to calculate a location of the user 750 for success in face recognition.

When a user authentication mode is executed, the controller 120 compares a user profile of a user who succeeds in face recognition with a previously stored registration user profile. When it is determined that the user is the same person as a previously stored registration user, in executing the user authentication mode later, the controller 120 may apply the user profile to at least one of calculation of a location of the user 750 for success in face recognition and/or the fourth guide 731.

A face recognition unlocking device 100 according to an embodiment of the present disclosure may apply at least one or more of a user profile of the user who succeeds in face recognition and a user profile of the user determined as the same person as the previously stored registration user in the user authentication in executing the user authentication mode later, thus enhancing a success rate of the face recognition.

In addition, according to the face recognition unlocking device 100 according to an embodiment of the present disclosure, data about a location for success in face recognition may be accumulated for the same user and a previously registered user, thus increasing the convenience of use of the user.

The location for the success in face recognition is affected in a complex manner by several elements such as a body type of the user, an authentication place, a time, and the like. Thus, the controller 120 may apply data about the location for success in face recognition to a guide or calculation of a location of the user for success in face recognition, thus enhancing utilization of the face recognition unlocking device 100.

When the face recognition succeeds, the controller 120 may store a user profile. Herein, the user profile may include at least any one of location information of the user 750 and/or face image information of the user 750.

In FIG. 7, an embodiment is exemplified as the user profile is applied to the fourth guide 731, but the controller 120 may apply the user profile of the user who succeeds in face recognition to calculation of a location of the user 750 as well as a guide.

FIGS. 8 to 11 illustrate user profiles, when a face recognition unlocking device 100 fails in face recognition. Location information 810, 910, low and 1110 of users 850, 950, 1050, and 1150 who succeed in face recognition and user face image information 820, 920, 1020, and 1120 of the users 850, 950,1050, and 1150 who succeed in face recognition are shown.

Figure 8:
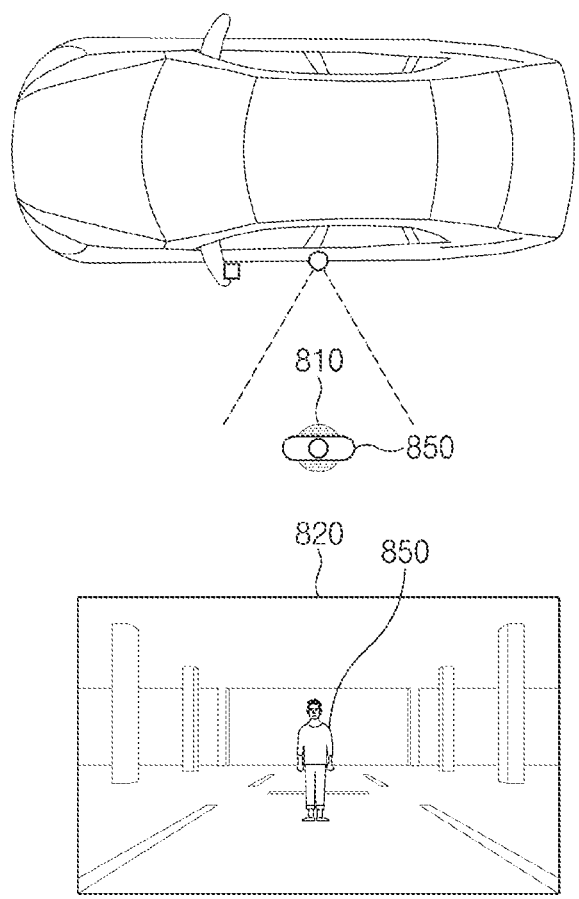
FIGS. 8, 9, 10, and 11 are drawings illustrating obtained user information, when a face recognition unlocking device fails in face recognition, according to an embodiment of the present disclosure.
Figure 9:
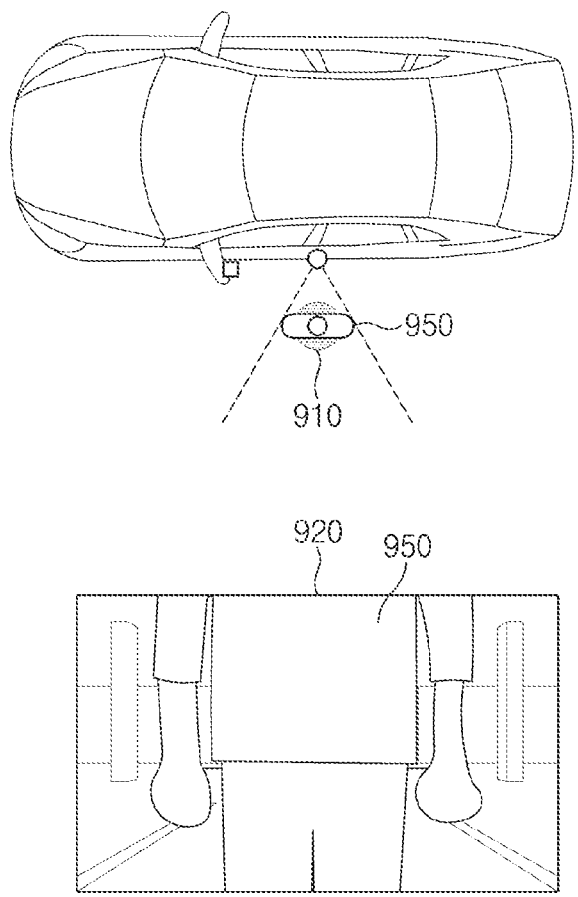

Referring to FIGS. 8 and 9, when a user 850 or 950 is within a range of the view angle of a collection device 110 described with reference to FIG. 1 in the face recognition unlocking device 100, but, when the collection device 110 is present at the location 810 too far away to the point that it is impossible to recognize a face of the user 850 or when the collection device 110 is present at the location 920 too close to the point that it is impossible to recognize a face of the user 950, the user face image information 820 or 920 is shown.

In this case, an output device 130 described with reference to FIG. 1 may guide the user 850 or 950 to move using a second guide for guiding the user 850 or 950 to move forward and backward.

Figure 10:
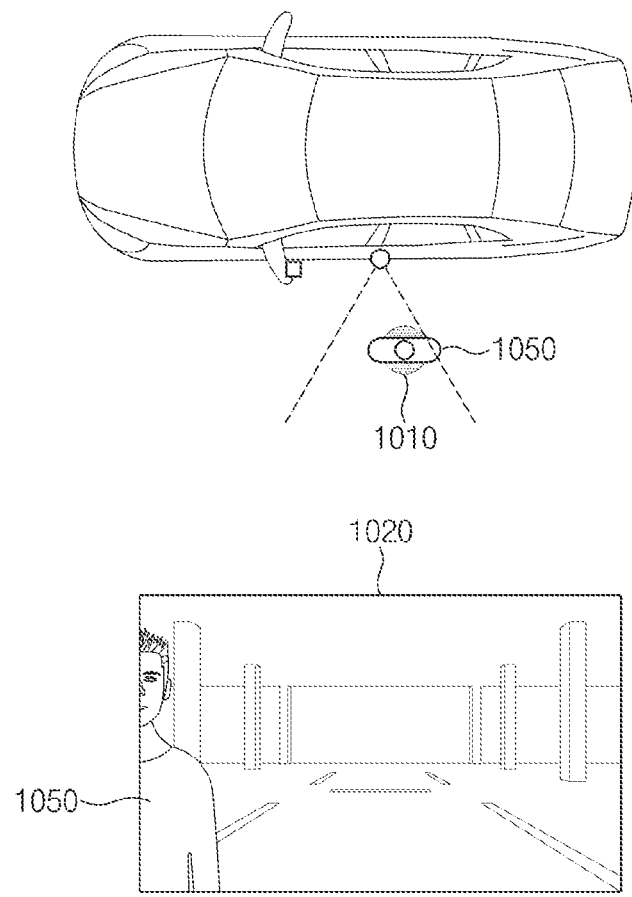

Referring to FIG. 10, when the user 1050 is within a range of the view angle of the collection device no described with reference to FIG. 1 in the face recognition unlocking device 100, but, when the collection device 110 is present at the location 1010 at a side to the point that it is impossible to recognize a face of the user 1050, the user face image information 1020 is shown.

In this case, the output device 130 described with reference to FIG. 1 may guide the user 1050 to move using a second guide for guiding the user 1050 to move left and right.

Figure 11:
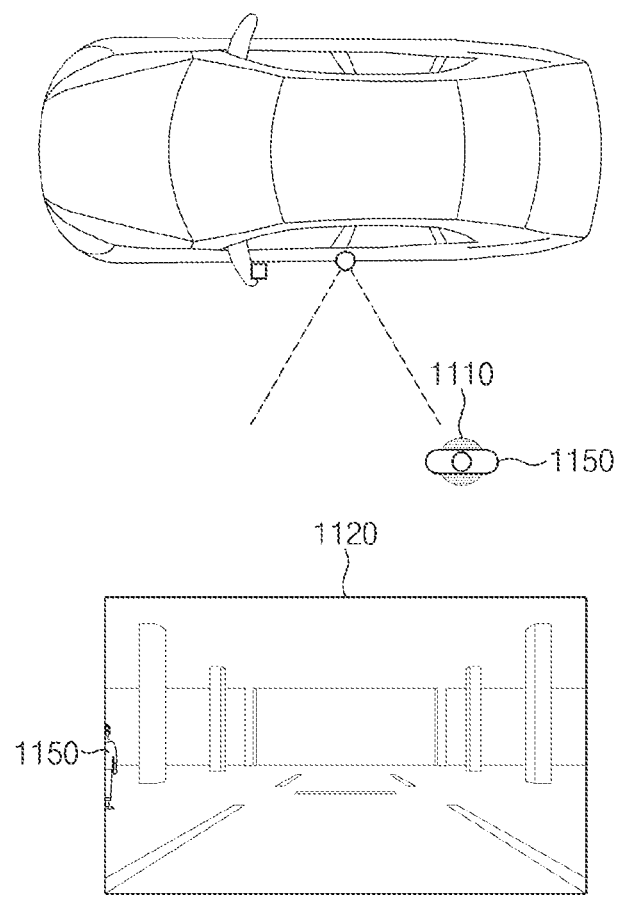

Referring to FIG. 11, when the user 1150 is outside a range of the view angle of the collection device no described with reference to FIG. 1 and when the collection device no is present at the location 1110 too far away to the point that it is impossible to recognize a face of the user 1150, the user face image information 1120 is shown.

In this case, the output device 130 described with reference to FIG. 1 may guide the user 1150 to move using a first guide for guiding the user 1150 to move into a view angle and a second guide for guiding the user 1150 to move forward and backward or left and right.

A controller 120 described with reference to FIG. 1 may first determine whether the user 1150 is within a range of the view angle of a camera in the collection device 110 from the collected information of the user 1150. When the user 1150 is outside the range of the view angle of the camera, the output device 130 may guide the user 1150 to move using the first guide. When the user 1150 is within the range of the view angle of the camera, the output device 130 may guide the user 1150 to move using the second guide.

Until the face recognition succeeds, the controller 120 may repeat the calculation of a location of the user 1150 for success in face recognition and the determination of whether the user 1150 is within the range of the view angle.

After the user 1150 moves along the guide, the controller 120 may control the collection device 110 to collect information of the user 1150 again. Furthermore, the controller 120 may apply the information of the user 1150, which is obtained again through the collection device 110, to calculate a location of the user 150 for success in face recognition.

Figure 12:
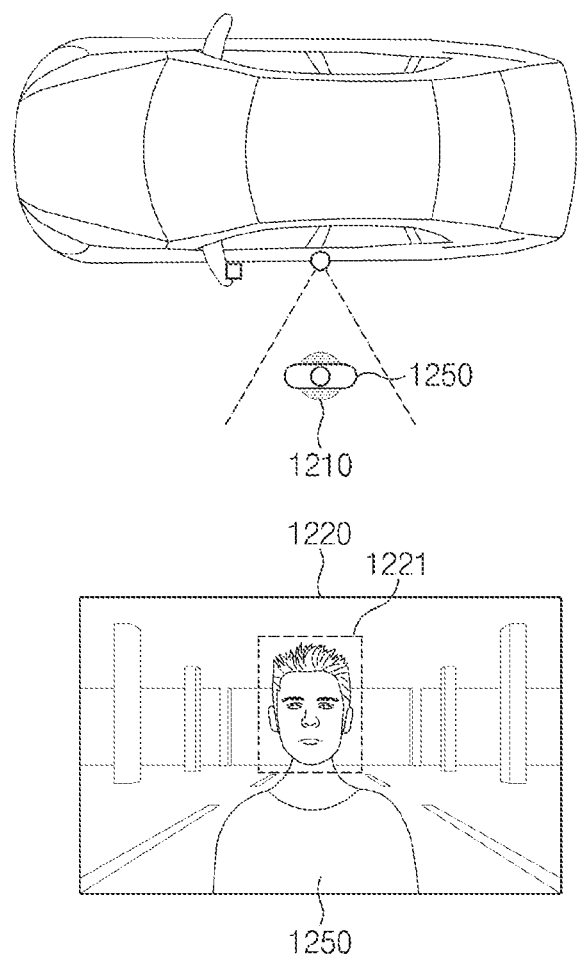
FIG. 12 is a drawing illustrating obtained user information and a stored user profile, when a face recognition unlocking device succeeds in face recognition, according to an embodiment of the present disclosure.

FIG. 12 is a drawing illustrating obtained information of a user 1250 and a user profile, when a face recognition unlocking device succeeds in face recognition, according to an embodiment of the present disclosure.

Referring to FIG. 12, when face recognition succeeds, user location information 1210 and user face image information 1220 included in a user profile stored in a controller 120 described with reference to FIG. 1 are shown.

In a user registration mode, when face recognition of a user 1250 succeeds, the controller 120 may store a user profile including the user location information 1210 and the user face image information 1220 as a registration user profile. The registration user profile may be a target to be compared with a user profile obtained in a user authentication mode, when the user authentication mode is executed.

In the user authentication mode, when the face recognition of the user 1250 succeeds, the controller 120 may compare the user profile including the user location information 1210 and the user face image information 1220 with a previously stored registration user profile. In this case, user face image information which is a target compared between the previously stored registration user profile and the user profile may be substantially limited to a face feature detection portion 1221.

For example, when performing user authentication using a method for measuring and comparing relative distance rates between ears, eyes, mouth, and nose from the obtained face image information of the user, the controller 120 may determine whether the user 1250 is the same person as a previously stored registration user by comparing the regions 1221 capable of detecting a face feature point of the user 1250 in the user face image information 1220.

Figure 13:
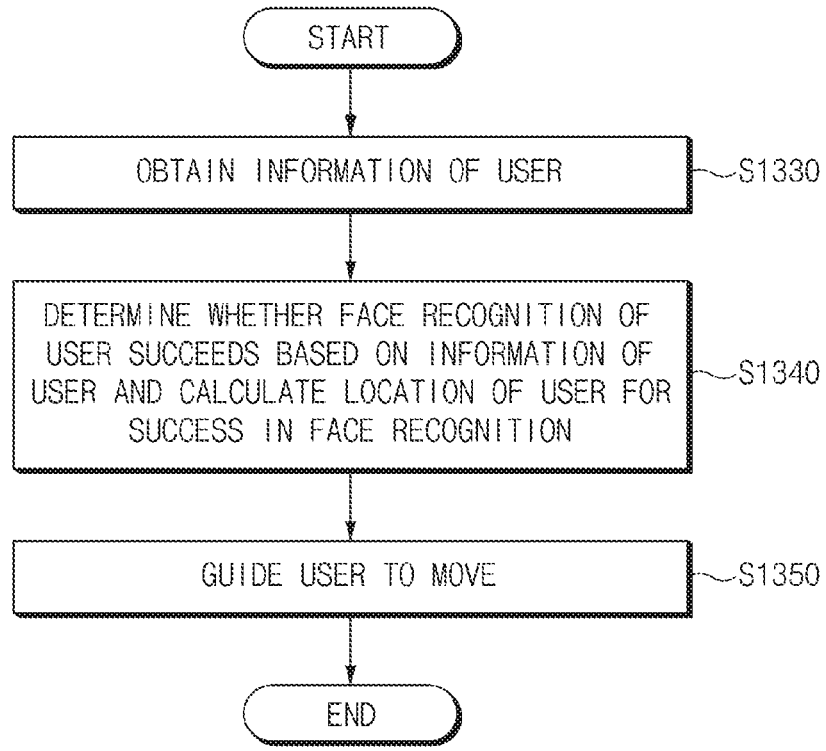
FIG. 13 is a flowchart illustrating an operation method of a face recognition unlocking device according to an embodiment of the present disclosure.

FIG. 13 is a flowchart illustrating an operation method of a face recognition unlocking device according to an embodiment of the present disclosure.

Referring to FIG. 13, the operation method of the face recognition unlocking device according to an embodiment of the present disclosure may include S1330 of obtaining information of a user, S1340 of determining whether face recognition of the user succeeds based on the information of the user and calculating a location of the user for success in face recognition, and S1350 of guiding the user to move.

Hereinafter, S1330 to S1350 will be described with reference to FIG. 1.

In S1330, a collection device no may collect the information of the user. The information of the user may include location information of the user, face image information of the user, information about whether a face recognition unlocking device 100 is enabled, and the like.

In S1340, a controller 120 may determine whether the face recognition succeeds based on the information of the user, obtained by the collection device 110, and may calculate the location of the user for success in the face recognition.

In S1350, an output device 130 may guide the user to move.

Figure 14:
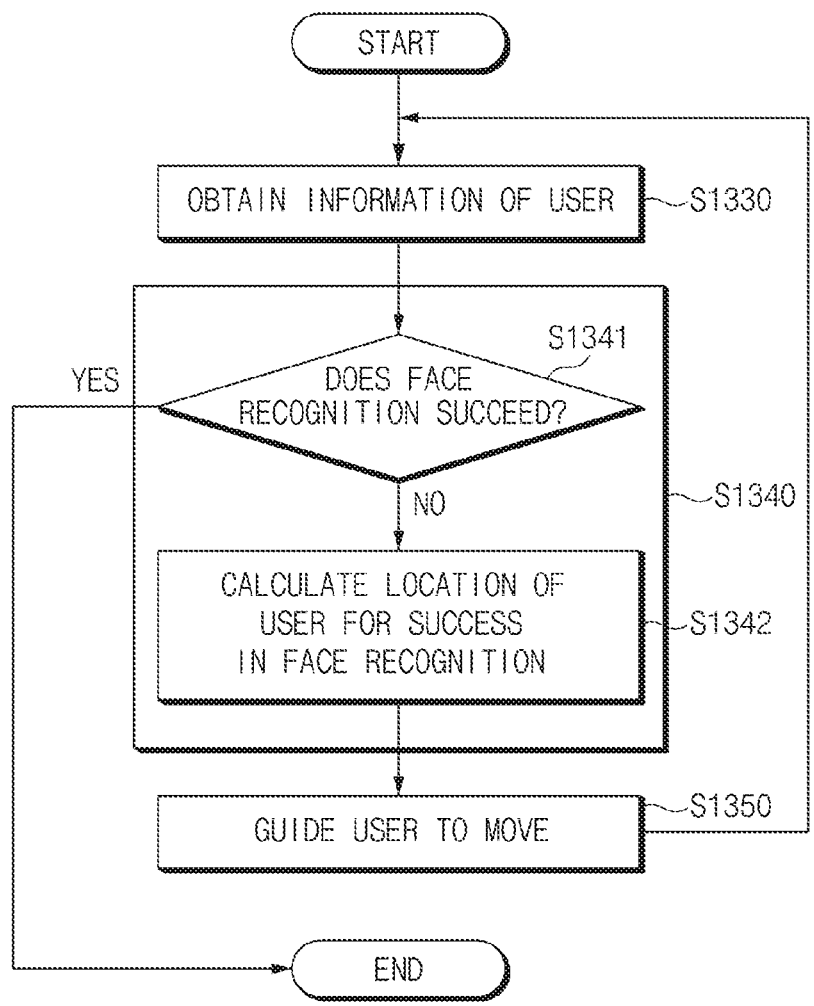
FIG. 14 is a flowchart illustrating in detail an operation of determining whether face recognition of a user succeeds based on information of the user and calculating a location of the user for success in face recognition, in an operation method of a face recognition unlocking device, according to an embodiment of the present disclosure.

FIG. 14 is a flowchart illustrating in detail an operation of determining whether face recognition of a user succeeds based on information of the user and calculating a location of the user for success in face recognition, in an operation method of a face recognition unlocking device, according to an embodiment of the present disclosure.

Hereinafter, S1341 and S1342 will be described with reference to FIG. 1.

In S1341, a controller 120 may determine whether face recognition of the user succeeds, based on information of the user, obtained by a collection device 110. When the face recognition of the user succeeds in S1341, the controller 120 may fail to proceed to S1342 and S1350. In this case, an output device 130 may fail to guide the user to move.

When the face recognition fails, in S1342, the controller 120 may calculate a location of the user for success in face recognition, based on the information of the user, obtained by the collection device 110.

When the face recognition fails, in S1350, the output device 130 may guide the user to move to the location of the user for success in the face recognition, calculated by the controller 120.

After the user moves, the controller 120 may proceed to S1330. By proceeding to S1330, the collection device 110 may obtain information of the user again.

When the information of the user is obtained again, the controller 120 may proceed to S1340 of determining whether face recognition of the user succeeds by applying the obtained information of the user and calculating a location of the user for success in face recognition.

S1330 to S1350 may be repeated until the face recognition succeeds.

Figure 15:
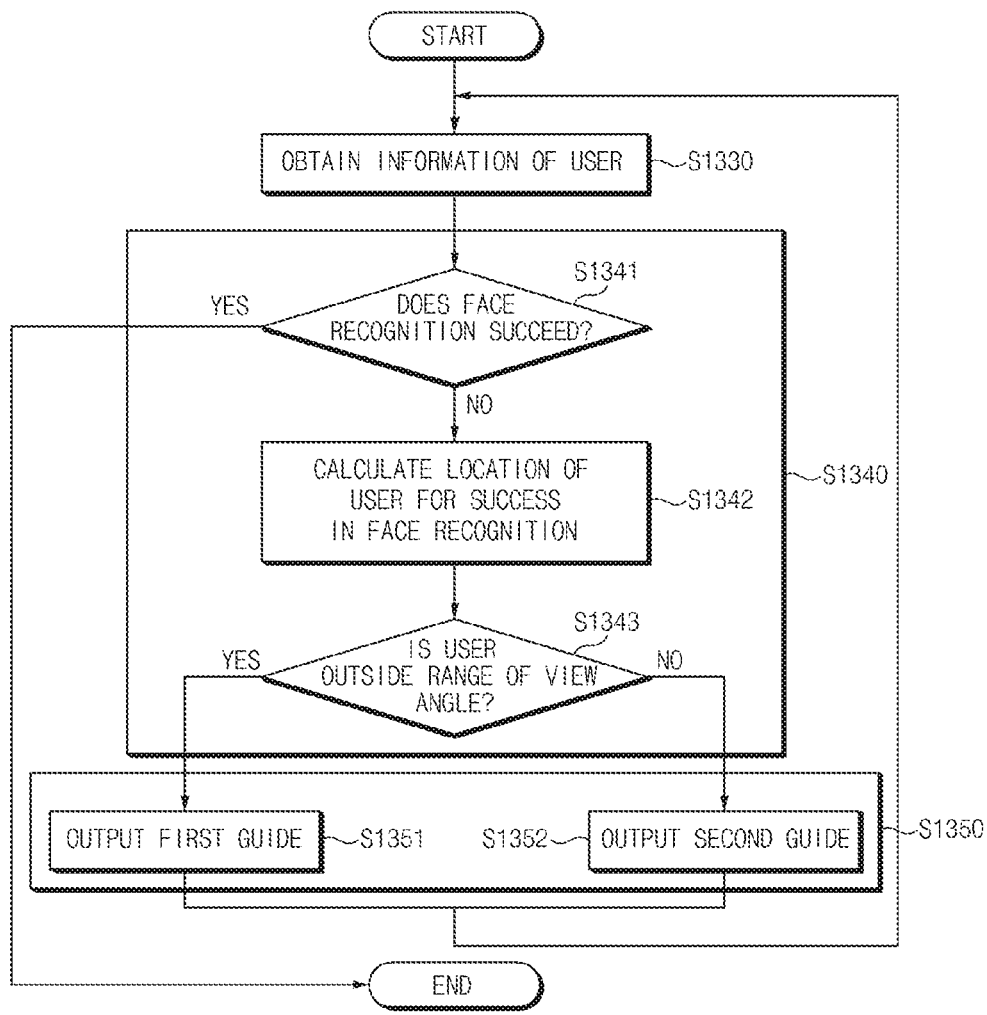
FIG. 15 is a flowchart illustrating an operation of outputting first and second guides, in an operation method of a face recognition unlocking device, according to an embodiment of the present disclosure.

FIG. 15 is a flowchart illustrating an operation of outputting first and second guides, in an operation method of a face recognition unlocking device, according to an embodiment of the present disclosure.

Referring to FIG. 15, S1350 of guiding the user to move may include at least any one of S1351 of outputting a first guide to guide the user to move to a calculated location of the user and/or S1352 of outputting a second guide to guide the user to move to a calculated location of the user, when face recognition fails.

In this case, whether to output any of the first guide or the second guide may be varied according to whether the user is at any location with respect to a range of a view angle of a camera in a collection device 110. In S1343, this may be determined by the controller 120 in S1340 of calculating a location of the user.

After the user moves according to the guidance of an output device 130 in S1350, the controller 120 may control the collection device no to obtain information of the user again. In S1341, the controller 120 may determine whether face recognition succeeds, based on the information of the user, which is obtained again after the user moves.

S1350 of guiding the user to move, S1330 of obtaining the information of the user, and S1341 of determining whether the face recognition succeeds may be repeated until the face recognition of the user succeeds. When the face recognition succeeds in S1341, the controller 120 does not proceed to S1342 to S1350 any longer to end the operation method.

Figure 16:
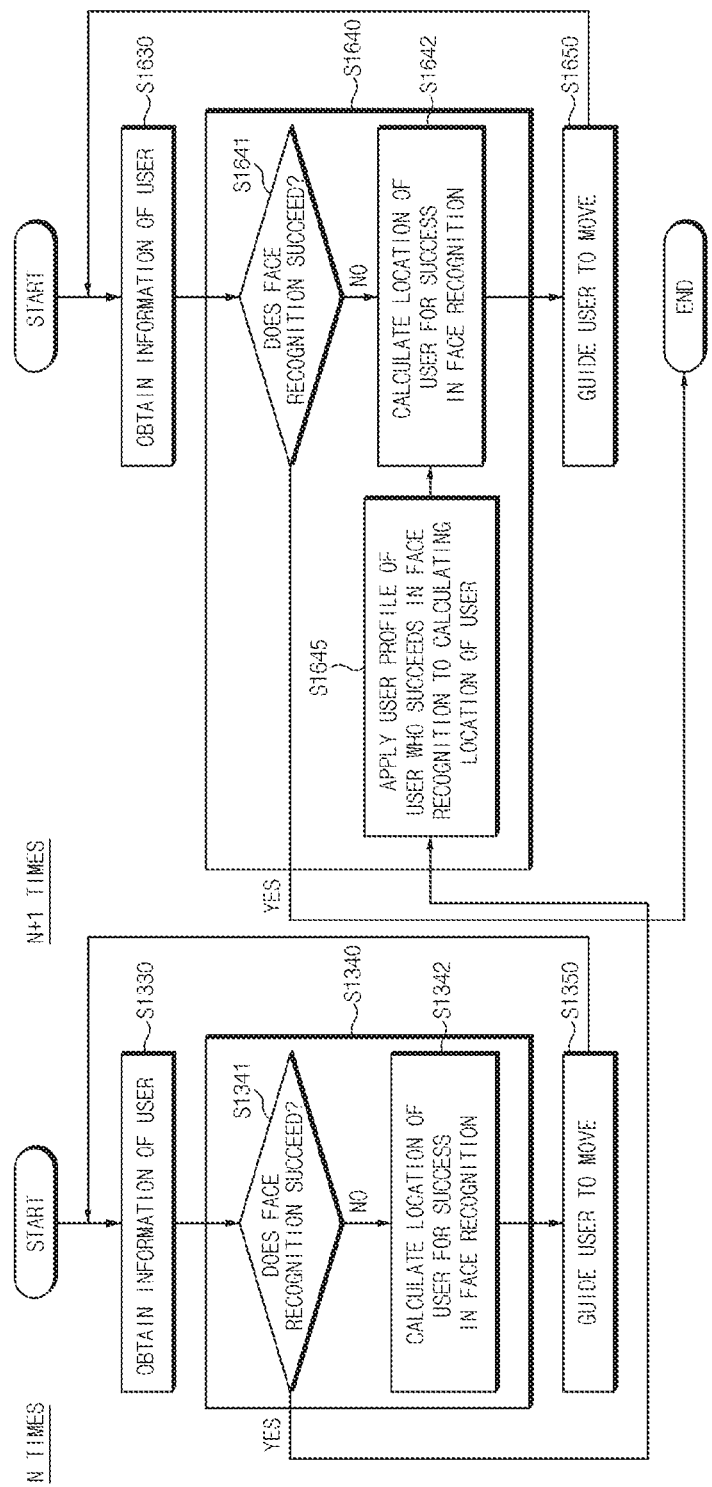
FIG. 16 is a flowchart illustrating a method for applying a user profile of a user who succeeds in face recognition to an operation of determining whether face recognition succeeds and calculating a location of the user for success in face recognition, in an operation method of a face recognition unlocking device, according to an embodiment of the present disclosure.

FIG. 16 is a flowchart illustrating a method for applying a user profile of a user who succeeds in face recognition to an operation of determining whether face recognition succeeds and calculating a location of the user for success in face recognition, in an operation method of a face recognition unlocking device, according to an embodiment of the present disclosure.

Referring to FIG. 16, S1640 of calculating a location of a user for success in face recognition, executed N+1 times, may further include S1645 of applying a user profile including at least any one of location information of a user who succeeds in face recognition and/or face image information of the user who succeeds in the face recognition to calculate a location of the user for success in face recognition.

Like the flowchart in FIG. 16, when the face recognition succeeds N times, a corresponding user profile may be applied when a face recognition function is performed N+1 times to enhance a success rate of face recognition, thus improving user convenience.

Figure 17:
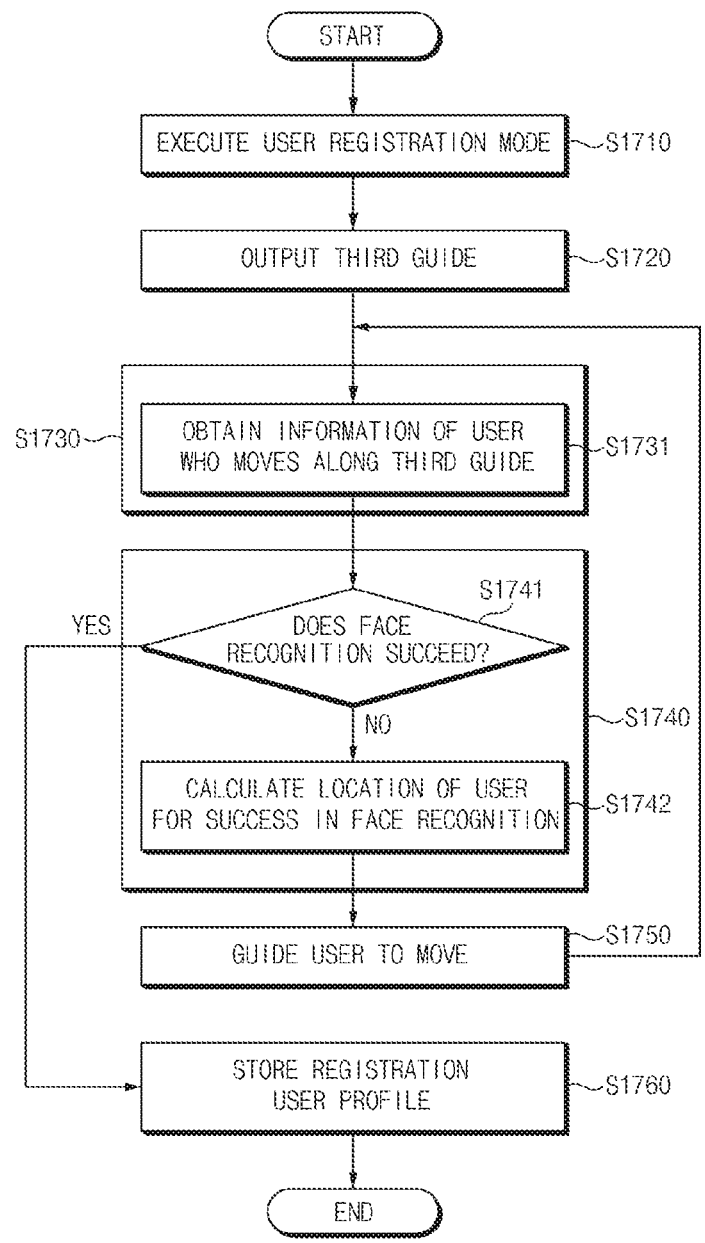
FIG. 17 is a flowchart illustrating a method for performing a user registration mode, in an operation method of a face recognition unlocking device, according to an embodiment of the present disclosure.

FIG. 17 is a flowchart illustrating a method for performing a user registration mode, in an operation method of a face recognition unlocking device, according to an embodiment of the present disclosure.

Referring to FIG. 17, an operation method of a face recognition unlocking device 100 according to an embodiment of the present disclosure may further include S1710 of executing a user registration mode, when the face recognition unlocking device 100 is enabled and when a condition for executing the user registration mode is met.

A condition where the face recognition unlocking device 100 is enabled follows a user setting. As an embodiment, when an enable signal for the face recognition unlocking device 100 is obtained through an input signal collection device included in a collection device 110, a controller 120 may determine whether the face recognition unlocking device 100 is enabled, based on the enable signal.

The face recognition unlocking device 100 may further have a separate condition for executing the user registration mode other than the enable signal.

For example, the face recognition unlocking device 100 according to an embodiment of the present disclosure may further determine whether the user has a registration user authentication means to determine whether to execute the user registration mode.

The registration user authentication means refers to a means capable of verifying that a user who has a smart key or a pass is authorized to gain entrance or perform unlocking through the face recognition unlocking device 100.

In an embodiment of the present disclosure, when an enable signal for the face recognition unlocking device 100 is obtained through the collection device 110, the controller 120 may be configured to execute the user registration mode, only when a time when the enable signal is obtained is greater than or equal to a predetermined time and only when it is determined whether the smart key is provided together with obtaining the enable signal.

In an embodiment of the present disclosure, the face recognition unlocking device 100 may execute S1710 when the above condition is met and may then proceed to S1720 of outputting a third guide.

In other words, when the face recognition unlocking device 100 is enabled and when the controller 120 determines that the condition for executing the user registration mode is met, the controller 120 may execute S1710 and may then proceed to S1720.

In S1720, an output device 130 may output the third guide to guide a user to move.

The third guide may be a guide for guiding the user to move into a range of a location where it is expected that face recognition of the user will succeed.

The location where it is expected that the face recognition of the user will succeed may be a location which is preset with respect to the collection device 110 and may be a location which is set based on face recognition success location information stored in a memory of the face recognition unlocking device 100. A thing capable of guiding the user to a specific location is sufficient for the third guide, and the third guide is not limited to the embodiment.

After the output device 130 outputs the third guide to guide the user to move in S1720, the controller 120 may proceed to S1730.

In S1730, the collection device no may obtain information of the user who moves along the third guide.

When the collection device 110 obtains the information of the user who moves along the third guide, the controller 120 may proceed to S1740 of determining whether face recognition of the user succeeds and calculating a location of the user for success in face recognition.

In detail, when the face recognition of the user succeeds in S1741, the controller 120 may fail to proceed to S1742 and S1750.

When the face recognition fails in S1741, the controller 120 may proceed to S1742 of calculating a location of the user and S1750 of guiding the user to move.

S1730 to S1750 may be repeated until the face recognition succeeds. When the face recognition succeeds in S1741, the controller 120 may proceed to S1760.

In S1760, the controller 120 may store a registration user profile. In this case, the registration user profile may include at least any one of location information of the user and/or face image information of the user. When the user registration mode is executed, the registration user profile may be stored when the face recognition succeeds.

Figure 18:
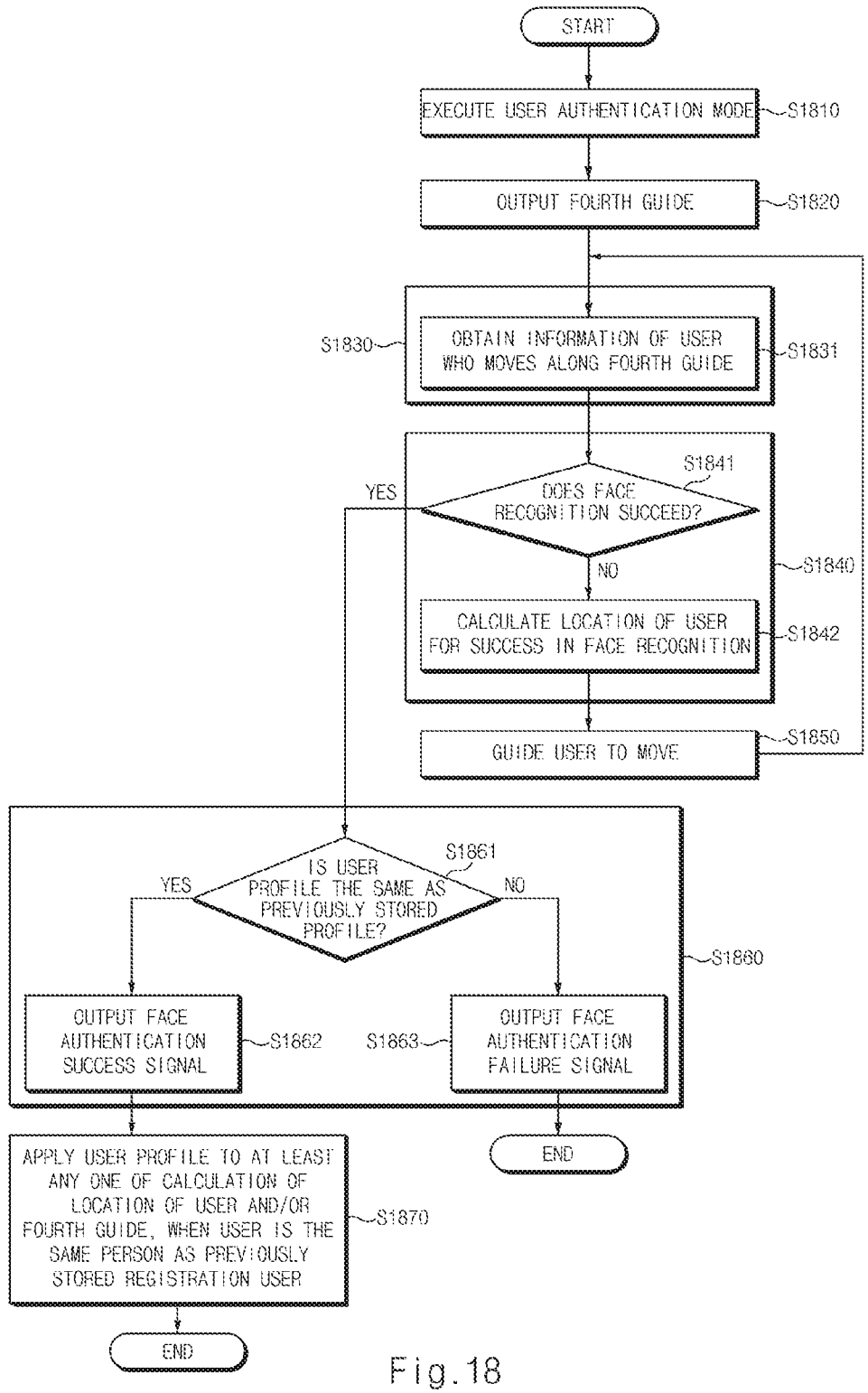
FIG. 18 is a flowchart illustrating a method for applying a user profile, when a face recognition success signal is output when performing a user authentication mode, to an operation method of a face recognition unlocking device, according to an embodiment of the present disclosure.

FIG. 18 is a flowchart illustrating a method for applying a user profile, when a face recognition success signal is output when performing a user authentication mode, to an operation method of a face recognition unlocking device, according to an embodiment of the present disclosure.

Referring to FIG. 18, an operation method of a face recognition unlocking device 100 according to an embodiment of the present disclosure may further include S1810 of executing a user authentication mode, when the face recognition unlocking device 100 is enabled and when a condition for executing the user authentication mode is met.

A condition where the face recognition unlocking device 100 is enabled follows a user setting. As an embodiment, when an enable signal for the face recognition unlocking device 100 is obtained through an input signal collection device included in a collection device 110, a controller 120 may determine whether the face recognition unlocking device 100 is enabled, based on the enable signal.

The face recognition unlocking device 100 may further have a separate condition for executing the user authentication mode other than the enable signal.

For example, the face recognition unlocking device 100 according to an embodiment of the present disclosure may further determine whether the user has a registration user authentication means to determine whether to execute the user authentication mode.

The registration user authentication means refers to a means capable of verifying that a user who has a smart key or a pass is authorized to gain entrance or perform unlocking through the face recognition unlocking device.

In an embodiment of the present disclosure, when an enable signal for the face recognition unlocking device 100 is obtained through the collection device 110, the controller 120 may be configured to execute the user authentication mode, when a time when the enable signal is obtained is less than a predetermined time and when it is not determined whether the smart key is provided together with obtaining the enable signal.

In an embodiment of the present disclosure, the face recognition unlocking device 100 may execute S1810 when the above condition is met and may then proceed to S1820 of outputting a fourth guide.

In other words, when the face recognition unlocking device 100 is enabled and when the controller 120 determines that the condition for executing the user authentication mode is met, the controller 120 may execute S1810 and may then proceed to S1820.

In S1820, an output device 130 may output the fourth guide to guide a guide to move.

The fourth guide may be a guide for guiding the user to move to a location where it is expected that face recognition of the user will succeed. The location where it is expected that the face recognition of the user will succeed may be a location which is preset with respect to the collection device 110 and may be a location which is set based on face recognition success location information stored in a memory of the face recognition unlocking device 100.

The face recognition success location information used in the user authentication mode may refer to information collected through the face recognition unlocking device 100.

Because the user authentication mode is for determining whether the user is a registered user, the face recognition unlocking device 100 may output the fourth guide by applying the collected face recognition success location information. In this case, the controller 120 may apply location information in which face recognition of the user succeeds, which is previously collected, to a form of the fourth guide or calculation of a location of the user for success in face recognition.

The fourth guide may be output through the output device 130. A thing capable of guiding the user to a specific location is sufficient for the fourth guide, and the fourth guide is not limited to the embodiment.

After the output device 130 outputs the fourth guide to guide the user to move in S1820, the controller 120 may proceed to S1830.

In S1830, the collection device no may obtain information of the user who moves along the fourth guide.

When the collection device no obtains the information of the user who moves along the fourth guide, the controller 120 may proceed to S1840 of determining whether face recognition of the user succeeds and calculating a location of the user for success in face recognition.

In detail, when the face recognition of the user succeeds in S1841, the controller 120 may fail to proceed to S1842 and S1850.

When the face recognition fails in S1841, the controller 120 may proceed to S1842 of calculating a location of the user and S1850 of guiding the user to move.

S1830 to S1850 may be repeated until the face recognition succeeds. When the face recognition succeeds in S1841, the controller 120 may proceed to S1860.

In S1860, the controller 120 may compare the user profile with a previously registered registration user profile. In this case, the user profile may include at least any one of location information of the user and/or face image information of the user.

In S1860, the controller 120 may process the obtained user face image information and may compare the user profile with the previously stored registration user profile.

For example, the controller 120 may detect a face region of the user from the user face image information of the user profile and may detect a face feature point from the detected face region, thus mathematically performing matrix arithmetic processing of a face feature point vector value.

In this case, the controller 120 may compare the face feature point vector value, the matrix arithmetic processing of which is performed, with a feature vector value of the previously stored registration user profile to determine whether the user is the same person as a previously stored registration user.

In S1861, the controller 120 may compare the user profile with the previously stored registration user profile to determine whether the user is the same person as the previously stored registration user. When the user is the same person as a previously stored registration user, the controller 120 may proceed to S1862 of outputting a face authentication success signal. When the user is not the same person as a previously stored registration user, the controller 102 may proceed to S1863 of outputting a face authentication failure signal.

In S1870, the controller 102 may apply the user profile of the user who is the same person as the previously stored registration user to at least any one of calculation of the location of the user and/or the fourth guide.

In detail, the fourth guide may be a guide including location information of user profiles of users who succeed in face recognition.

The controller 102 may apply the user location information of the user profiles of the users who succeed in face recognition to calculating a location of the user for success in face recognition.

In S1870, the controller 102 may apply the user profile of the user who is determined as the same person as the previously stored registration user in the user authentication mode upon executing the user authentication mode later, thus enhancing a success rate of face recognition.

Furthermore, in S1870, data about a location for success in face recognition may be accumulated for the same user and a previously registered user, thus increasing the convenience of use of the user.

The location for success in face recognition is affected in a complex manner by several elements such as a body type of the user, an authentication place, a time, and the like. Thus, the controller 102 may apply data about the location for success in face recognition to a guide or calculation of the location of the user for success in face recognition, thus enhancing utilization of the face recognition unlocking device 100.

Figure 19:
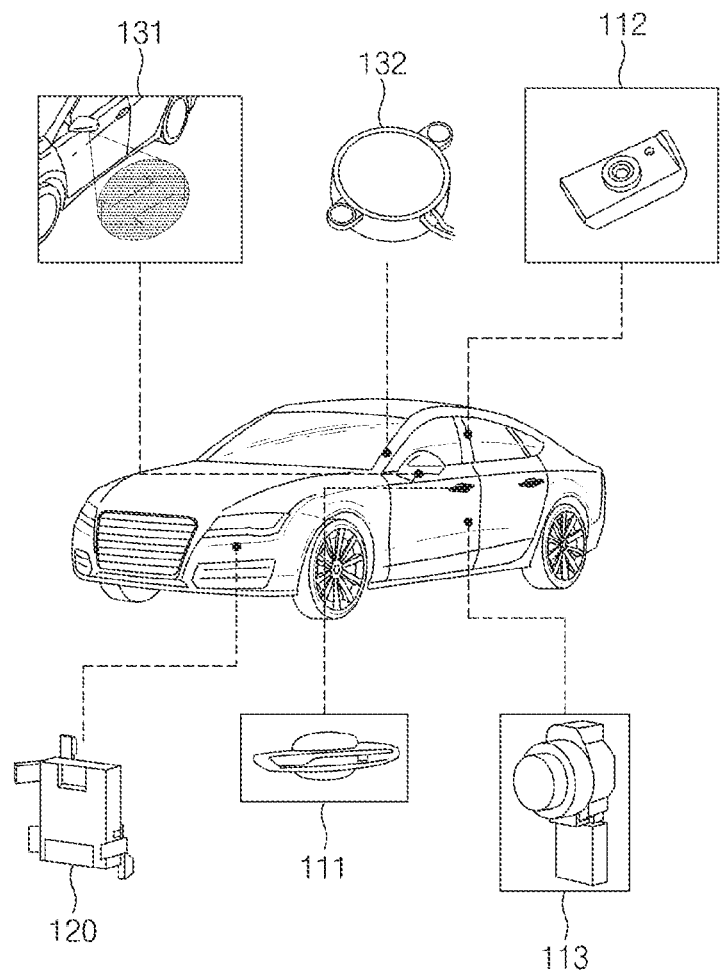
FIG. 19 is a drawing illustrating an example in which a face recognition unlocking device is applied to a vehicle, according to an embodiment of the present disclosure.

FIG. 19 is a drawing illustrating an example in which a face recognition unlocking device is applied to a vehicle, according to an embodiment of the present disclosure.

Referring to FIG. 19, the face recognition unlocking device according to an embodiment of the present disclosure may be applied to the vehicle. In the face recognition unlocking device for a vehicle according to an embodiment of the present disclosure, a collection device 110 may include an input device 111, a camera 112, and a position sensor 113.

Herein, the input device 111 may be a toggle type switch. In this case, the toggle type switch may be located in a door handle of the vehicle. The camera 112 may include at least any one of an image camera and/or an infrared camera. The camera 112 may be located in a driver's seat filler of the vehicle.

The position sensor 113 included in the face recognition unlocking device for a vehicle according to an embodiment of the present disclosure may be an ultrasonic sensor. The ultrasonic sensor may be located at one end of a door of the driver's seat of the vehicle.

In the face recognition unlocking device for a vehicle according to an embodiment of the present disclosure, an output device 130 may include a guide device 131 and an authentication signal output device 132.

Herein, the guide device 131 may be a puddle lamp. In this case, the puddle lamp may be located in a side mirror of the vehicle. The authentication signal output device 132 may be a speaker or a buzzer. The speaker or the buzzer may be located adjacent to the guide device 131.

A controller 120 may include a processor and a memory and may be located in a vehicle control unit.

A user may be more efficiently guided for face recognition through a guide of the face recognition unlocking device for a vehicle, including the above configuration.

The features, structures, effects, and the like exemplified in the description of the face recognition unlocking device are included in embodiments of the present disclosure. A function of the face recognition unlocking device according to an embodiment of the present disclosure is not necessarily limited to such an embodiment. In addition, it is possible for the features, structures, effects, and the like represented in such an example to be combined or modified and be executed by those skilled in the art to which the present disclosure pertains. Thus, when executed based on such combinations and modifications, it should be interpreted that the features, structures, effects, and the like are included in the scope of the present disclosure.

Furthermore, the description is given above of the face recognition unlocking device for a vehicle, but this is merely illustrative. The present disclosure is not limited to being used for a vehicle. Those skilled in the art to which the present disclosure pertains may make several modifications and applications which are not exemplified, without departing from the scope of the essential characteristics of the embodiments.

In addition, the guide signal for guiding the user to move is not necessarily limited to the embodiments. It is possible to modify a shape of the guide signal and a method for notifying the user of the signal depending on the technical field to which the present disclosure is applied.

In other words, because it is possible for respective components represented in detail in the embodiments to be modified and executed, it should be interpreted that differences associated with such modifications and applications are included in the spirit and scope of the present disclosure defined in the accompanying claims.

Embodiments of the present technology may provide the face recognition unlocking device for guiding the user to move such that a face recognition function is easily performed and the operation method thereof.

Particularly, embodiments of the present technology may provide the face recognition unlocking device for guiding the user to move to an optimal recognition location which is varied according to a location where a face recognition device is installed, a body type of the user, performance of a data collection device, and the like, in a data collection method of the face recognition unlocking device.

Embodiments of the present technology may provide the face recognition unlocking device for increasing a probability that face recognition will succeed and performing quick authentication and the operation method thereof.

In addition, various effects directly or indirectly ascertained through embodiments of the present disclosure may be provided.

Hereinabove, although the present disclosure has been described with reference to exemplary embodiments and the accompanying drawings, the present disclosure is not limited thereto, but may be various modified and altered by those skilled in the art to which the present disclosure pertains without departing from the spirit and scope of the present disclosure claimed in the following claims.

What is claimed is:

1. A face recognition unlocking device for a vehicle, comprising:
    a collection device comprising a camera and configured to obtain information of a user;
    a controller configured to:
        determine whether face recognition of the user succeeds or fails based on the information of the user;
        when the face recognition succeeds, store a user profile that includes location information of the user who succeeds in the face recognition or face image information of the user who succeeds in the face recognition, the stored the user profile being capable of being later applied to calculate a location of the user in a future face recognition operation; and
        when the face recognition fails, retrieve a previously stored user profile that includes location information of the user who succeeded in the face recognition or face image information of the user who succeeded in the face recognition and calculate a location of the user for success in the face recognition using the previously stored user profile; and
    an output device comprising a puddle lamp of the vehicle, the output device configured to output a visual guide to guide the user to move to the calculated location of the user using the puddle lamp when the face recognition fails;
    wherein the controller is configured to calculate a location with the highest frequency where the face recognition of the user succeeds, using the previously stored user profile; and
    wherein the output device is configured to output the visual guide for guiding the user to the location with the highest frequency where the face recognition of the user succeeds.

2. The face recognition unlocking device of claim 1, wherein:
    the controller is configured to calculate the location of the user for the success in the face recognition, when the face recognition fails; and
    the output device is configured to guide the user to move, based on the calculated location of the user.

3. The face recognition unlocking device of claim 1, wherein the visual guide includes a first guide that is configured to guide the user to move into a range of a view angle of the camera in the collection device, when the user is outside the range of the view angle of the camera in the collection device.

4. The face recognition unlocking device of claim 3, wherein the visual guide also includes a second guide that is configured to guide the user to move forward, backward, left, or right with respect to the camera in the collection device, when the user is within the range of the view angle of the camera in the collection device.

5. The face recognition unlocking device of claim 1, wherein the visual guide includes a second guide that is configured to guide the user to move forward, backward, left, or right with respect to the camera in the collection device, when the user is within a range of a view angle of the camera in the collection device.

6. The face recognition unlocking device of claim 1, wherein:
    the controller is configured to execute a user registration mode when the face recognition unlocking device is enabled and when a condition for executing the user registration mode is met;
    the output device is configured to output a further guide to guide the user to move when the user registration mode is executed;
    the collection device is configured to obtain the information of the user who moves along the further guide; and
    the controller is configured to store a registration user profile including at least one of location information of the user who succeeds in the face recognition and/or face image information of the user who succeeds in the face recognition.

7. The face recognition unlocking device of claim 1, wherein:
    the controller is configured to execute a user authentication mode when the face recognition unlocking device is enabled and when a condition for executing the user authentication mode is met;
    the output device is configured to output a further guide to guide the user to move when the user authentication mode is executed;
    the collection device is configured to obtain the information of the user who moves along the further guide; and
    the controller is configured to compare a user profile, including at least one of location information of the user who succeeds in the face recognition and/or face image information of the user who succeeds in the face recognition, with a previously stored registration user profile, output a face authentication success signal through the output device when the user is the same person as a previously stored registration user, and output a face authentication failure signal through the output device when the user is not the same person as the previously stored registration user.

8. The face recognition unlocking device of claim 7, wherein the controller is configured to apply the user profile when the user is the same person as the previously stored registration user to at least one of the location of the user and/or the further guide.

9. The face recognition unlocking device of claim 1, wherein the user profile includes both location information of the user who succeeds in the face recognition and face image information of the user who succeeds in the face recognition.

10. A method of operating a face recognition unlocking device of a vehicle, the method comprising:
    using a camera to obtain information of a user;
    determining whether face recognition of the user succeeds or fails based on the information of the user;
    in a case when the user recognition succeeds, storing a user profile that includes location information of the user who succeeds in the face recognition or face image information of the user who succeeds in the face recognition and calculating a location with the highest frequency where the face recognition of the user succeeds using previous information to create a previously stored user profile; and
    in a case when the user recognition fails, calculating a location of the user for success in the face recognition using the previously stored user profile that includes location information of the user who succeeded in the face recognition or face image information of the user who succeeded in the face recognition with the highest frequency, and using a puddle lamp of the vehicle to guide the user to move to the calculated location by outputting a visual guide for guiding the user to the location with the highest frequency where the face recognition of the user succeeds.

11. The method of claim 10, wherein the user is outside the range of a view angle of the camera and wherein using the puddle lamp to guide the user comprises guiding the user to move into the range of the view angle of the camera.

12. The method of claim 10, further comprising:
executing a user registration mode when a face recognition unlocking device is enabled and when a condition for executing the user registration mode is met;
using the puddle lamp to guide the user to move when the user registration mode is executed; and
storing a registration user profile including at least one of location information of the user who succeeds in the face recognition and/or face image information of the user who succeeds in the face recognition, wherein obtaining the information of the user includes obtaining the information of the user moving when the user registration mode is executed.

13. The method of claim 10, further comprising:
executing a user authentication mode when a face recognition unlocking device is enabled and when a condition for executing the user authentication mode is met;
using the puddle lamp to guide the user to move when the user authentication mode is executed;
comparing a user profile, including at least one of location information of the user who succeeds in the face recognition and/or face image information of the user who succeeds in the face recognition, with the previously stored user profile;
outputting a face authentication success signal when the user is the same person as a previously stored registration user; and
outputting a face authentication failure signal when the user is not the same person as the previously stored registration user, wherein obtaining the information of the user includes obtaining the information of the user moving when the user authentication mode is executed.

14. The method of claim 13, further comprising applying a user profile when the user is the same person as the previously stored registration user to the location of the user.

15. The method of claim 10, wherein the user is within the range of a view angle of the camera and wherein using the puddle lamp to guide the user comprises guiding the user to move forward, backward, left, or right with respect to the camera.

16. A method of unlocking a vehicle, the method comprising:
using a camera to obtain information of a user;
determining that a face recognition of the user fails based on a current location of the user;
retrieving a previously stored user profile that includes location information of the user who succeeded in the face recognition or face image information of the user who succeeded in the face recognition;
calculating a location of the user for success in the face recognition using the previously stored user profile, the location being a location where the user can be authenticated using the camera, wherein the location is calculated as a location with the highest frequency where the face recognition of the user succeeds, using the previously stored user profile;
determining that the user is outside a range of a view angle of the camera;
using a puddle lamp of the vehicle to guide the user to move into the range of the view angle of the camera based on a visual guide for guiding the user to the location with the highest frequency where the face recognition of the user succeeds;
after the user is moved into the range of the view angle of the camera, using the puddle lamp to guide the user to move forward, backward, left, or right with respect to the camera;
determining that that the user is at the location where the user can be authenticated using the camera;
authenticating the user using a face recognition based on an image of the user obtained from the camera; and
unlocking a door of the vehicle in response to the authenticating.

17. The method of claim 16, further comprising storing a user profile in response to authenticating, wherein the user profile includes location information of the user or face image information of the user or both.

18. The method of claim 16, further comprising applying a user profile based on a previously stored registration of the user.

19. The method of claim 16, further comprising storing a user profile when the face recognition succeeds, wherein the user profile includes location information of the user who succeeds in the face recognition or face image information of the user who succeeds in the face recognition, the stored the user profile being capable of being later applied to calculate a location of the user in a future face recognition operation.

20. The method of claim 10, wherein using the puddle lamp to guide the user comprises:
determining that the user is outside the range of a view angle of the camera;
guiding the user to move into the range of the view angle of the camera; and
after the user is within the range of the view angle of the camera, guiding the user to move forward, backward, left, or right with respect to the camera.

* * * * *